US012682430B2

(12) United States Patent
Gupta et al.

(10) Patent No.: US 12,682,430 B2
(45) Date of Patent: Jul. 14, 2026

(54) MACHINE-LEARNING MODELS FOR EXTRACTING AND CLASSIFYING IMAGE CONTENT, AND AUGMENTING IMAGE BASED ON SAME

(71) Applicant: Maplebear Inc., San Francisco, CA (US)

(72) Inventors: Sanchit Gupta, Seattle, WA (US); Axel Mange, New York, NY (US)

(73) Assignee: Maplebear Inc., San Francisco, CA (US)

( * ) Notice: Subject to any disclaimer, the term of this patent is extended or adjusted under 35 U.S.C. 154(b) by 127 days.

(21) Appl. No.: 18/920,527

(22) Filed: Oct. 18, 2024

(65) Prior Publication Data

US 2026/0111999 A1 Apr. 23, 2026

(51) Int. Cl.
*G06T 5/50* (2006.01)
*G06V 30/19* (2022.01)

(52) U.S. Cl.
CPC .......... *G06T 5/50* (2013.01); *G06V 30/19093* (2022.01); *G06T 2207/20221* (2013.01)

(58) Field of Classification Search
CPC ............ G06T 5/50; G06T 2207/20221; G06V 30/19093
See application file for complete search history.

(56) References Cited

U.S. PATENT DOCUMENTS

2025/0054322 A1* 2/2025 Ye .......................... G06F 40/279
2025/0225780 A1* 7/2025 Ding ...................... G06N 3/045

* cited by examiner

*Primary Examiner* — Grace Q Li
(74) *Attorney, Agent, or Firm* — Fenwick & West LLP

(57) ABSTRACT

An online system that displays items from an item catalog to users supplements content displayed for one or more of the items with information extracted from images of the items. For a particular item in the item catalog, the online system performs image processing, such as optical character recognition, on one or more images of the item to extract text phrases from the images. For each extracted text phrase, the system then uses a trained model to score the text phrase as being a viable informational message. If the score for a text phrase is above a threshold, the online system augments content displayed in a user interface for the item with the text phrase. The online system may decide whether to supplement content for the item with an extracted text phrase based on the output of a predictive model.

20 Claims, 4 Drawing Sheets

| Customer Client Device 100 | Picker Client Device 110 | Retailer Computing System 120 |

Network 130

Online Concierge System 140

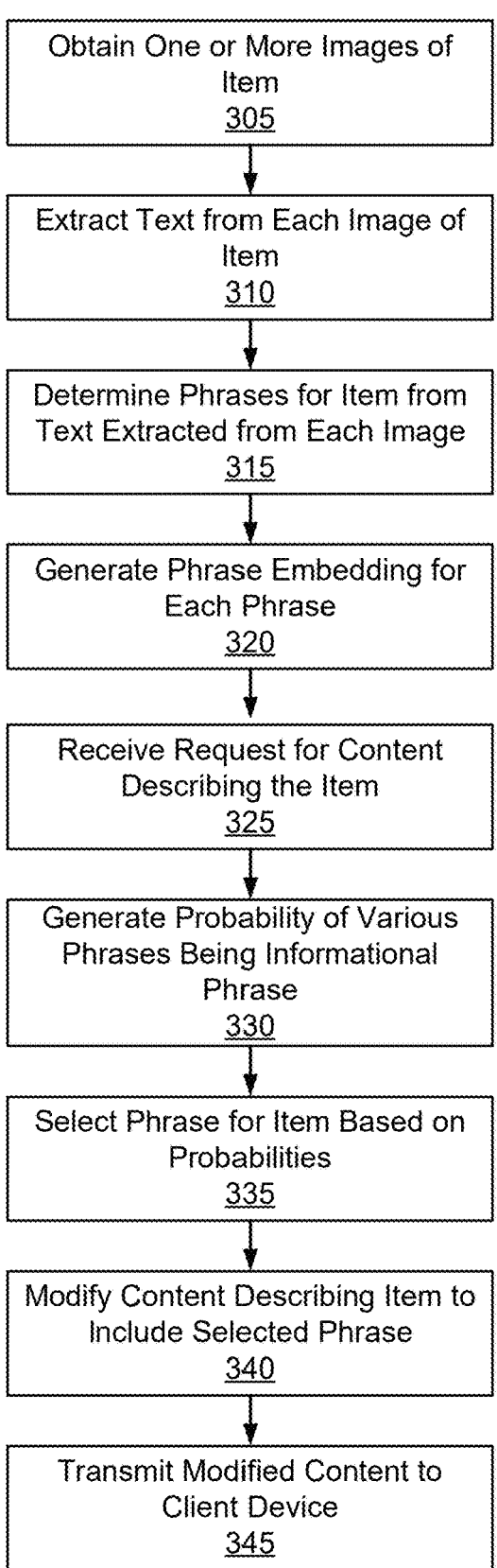

Obtain One or More Images of Item
305

Extract Text from Each Image of Item
310

Determine Phrases for Item from Text Extracted from Each Image
315

Generate Phrase Embedding for Each Phrase
320

Receive Request for Content Describing the Item
325

Generate Probability of Various Phrases Being Informational Phrase
330

Select Phrase for Item Based on Probabilities
335

Modify Content Describing Item to Include Selected Phrase
340

Transmit Modified Content to Client Device
345

FIG. 3

MACHINE-LEARNING MODELS FOR EXTRACTING AND CLASSIFYING IMAGE CONTENT, AND AUGMENTING IMAGE BASED ON SAME

BACKGROUND

Various online systems, such as online concierge systems, allow a user to obtain items from various sources, such as various retailers. An online system presents content describing one or more items to a user, and the user includes an item in an order or otherwise identifies the item for acquisition by selecting content describing the item. For example, an online system presents an interface including content describing different items to the user in response to receiving a request for one or more items from the user. Example content describing an item comprises an image of the item and one or more attributes of the item.

When presenting content describing an item to a user, many online systems generate the content from descriptive information about the item stored by the online system or retrieved by the online system. Conventionally, an entity associated with the item provides the descriptive information about the item to the online system. For example, a brand associated with or a manufacturer of the item provides one or more images of the item, attributes of the item, or another type of description of the item to the online system. Based on the descriptive information about the item obtained by the online system, the online system generates content describing the item for presentation to users.

Many items are included in packaging that has messages or other information about the item. Messages or information included on an item's packaging often emphasizes or identifies particular attributes of the item that increase a likelihood of a user acquiring the item or performing another specific interaction with the item. For example, packaging prominently displays one or more ingredients of an item or displays information emphasizing one or more steps performed to create the item. While many online systems include an image of an item, which may include the item in its packaging, in content describing the item, messages or other information included on the item's packaging is typically difficult for a user to discern through the content describing the item generated by an online system. This prevents messages or other content presented on packaging of the item from affecting interactions by the user with content describing the item presented by the online system, decreasing interaction with the item by users of the online system.

SUMMARY

In accordance with one or more aspects of the disclosure, an online system, such as an online concierge system, maintains or obtains information describing various items available to users of the online system. For example, an online concierge system maintains an item catalog for a retailer that includes information describing items a user may obtain from the retailer. In various embodiments, the item catalog includes attributes of each item, one or more images of each item, or other descriptive information about each item. The online system displays content describing one or more items available to a user through one or more interfaces. The user may select an item for inclusion in an order or otherwise select an item by performing a specific interaction with content describing the item. For example, the online system receives a search query from a user, selects items having at least one attribute that at least partially matches the search query, and generates an interface including content describing each selected item to the user.

Content describing an item and presented by the online system includes various attributes or other descriptive information about the item in various embodiments. For example, content describing the item comprises an image of the item from an item catalog (or obtained from an entity associated with the item) and one or more attributes (e.g., a cost of the item, a size of the item, one or more constituent components of the item, etc.) of the item obtained from the item catalog or obtained from another source. While content describing items presented by the online system allows a user to review different items, the descriptive information included in content describing an item is based on information about the item maintained by the online system, by a retailer, or by an entity associated with the item.

Many items available through the online system are included in packaging, with the packaging displaying information about the item, such as text data describing the item or otherwise relevant to the item. Portions of the text data on packaging of the item may include one or more informational messages comprising text that increases a likelihood of a user purchasing or obtaining the item. For example, an informational message identifies one or more specific attributes of the item or emphasizes one or more steps in creating the item. While content describing the item presented by the online system often includes an image of the item in its packaging, one or more informational messages on the packaging may be difficult to be deciphered by the user viewing the content describing the item. This prevents text data on the item's packaging from affecting a probability of the user purchasing or obtaining the item. Augmenting content describing the item with additional information about the item, such as one or more informational phrases included on the item's packaging, may increase a likelihood of a user performing the specific interaction with the item. For example, an attribute of the item emphasized by an informational message on the item's packaging complements content describing the item presented by an online system to increase a likelihood of a user including the item in an order.

To leverage text data on an item's packaging to augment content describing an item, the online system obtains one or more images of the item. In various embodiments, each image corresponds to a different portion of packaging of the item. For example, each image corresponds to a different surface of packaging of the item. As an example, a first image is of a front surface of the item's packaging, a second image is of a back surface of the item's packaging, a third image is of a left surface of the item's packaging, and a fourth image is of a right surface of the item's packaging. In some embodiments, multiple images may be obtained for a particular surface, or portion of a surface, of the item's packaging. Images of the item may be obtained from client devices, from a retailer system, from a third party system, or from an entity associated with the item (e.g., a manufacturer of the item, a distributor of the item, a brand associated with the item, etc.). Different images of the item may be obtained from different sources in some embodiments.

The online system extracts text from each image by applying one or more optical character recognition models or computer vision models to different images. In some embodiments the online system applies a combination of models to an image to extract text from the image. In some embodiments, the online system applies a multimodal large language model (LLM) to an image to extract text from the image. The multimodal LLM receives an image as input and outputs text based on the received image, such as text extracted from the received image. Text extracted from an image of the item is stored in association with the image from which it is extracted.

While application of one or more models to images of the item extracts text from various images, text extracted from an image by the online system is affected by positioning of text or characters on the packaging included in the image. For example, words appearing on different lines in an image are extracted as discrete words, rather than as a phrase. As the dimensions or shape of the item's packaging affects formatting and relative positioning of text on the packaging, text extracted from an image of the item, or of the item's packaging, may not accurately represent the content conveyed by the item's packaging. For example, a phrase is displayed across multiple lines on the item's packaging, with the positioning of the text comprising the phrase causing the online system to extract individual words comprising the phrase rather than the phrase in its entirety. To mitigate for effects of relative positioning of different text on an item's packaging on extraction of text from images of the item, the online system applies one or more models to text extracted from an image of the item to generate one or more phrases for the item from various images of the item.

In various embodiments, the online system generates one or more phrases for the item by applying a generative model, such as a large language model (LLM) to the text extracted from an image of the item. For example, the online system generates a prompt for a LLM including the text extracted from the image of the item and an instruction to join portions of the extracted text to form complete phrases or sentences. The LLM is pre-trained on a large text corpus to generate relationships between different portions of text and generates phrases each comprising one or more portions of the extracted text based on the instruction in the prompt and the previously generated relationships between different portions of text. One or more of the phrases may comprise a combination of a plurality of portions of the text extracted from an image. The online system generates phrases for each obtained image of an item in various embodiments, creating a set of phrases for the item based on the images of the product. The online system stores an association between one or more phrases and an image from which text used to generate the one or more phrases was extracted. In embodiments where the online system obtains images of different portions of the item's packaging, the set of phrases includes phrases generated from different images corresponding to various portions of the item's packaging.

Different phrases generated for the item from the images provide varying levels of information about the item to a user While informational phrases emphasize or identify specific attributes of an item, other phrases provide contextual information about the item or about an entity associated with the item that is unlikely to affect a user's likelihood of performing the specific interaction with the item. Hence, different phrases generated from extracted text differently affect a likelihood of the user performing the specific interaction with the item. To evaluate likely effects of different generated phrases on the user performing the specific interaction with the item, the online system generates a phrase embedding for each phrase, with a phrase embedding representing a phrase in a latent space. The online system applies a trained phrase classification model to each combination of a phrase embedding, an embedding of the item, and an embedding of an entity associated with the item (e.g., a brand associated with the item 400, a distributor of the item

400, a manufacturer of the item 400, etc.) to generate a probability of the phrase being an informational phrase. As further described above, an informational phrase is a phrase including information about the item that increases a likelihood of the user performing a specific interaction with the item (e.g., that increases the probability of the user performing the specific interaction with the item by at least a threshold amount).

In various embodiments, the online system trains the phrase classification model by obtaining multiple training examples. Each training example includes a phrase embedding for a training phrase, an embedding for a training item, and an embedding for a training entity associated with the training item. A label is applied to each training example, with a label applied to a training example indicating whether the training phrase in the training example is an informational phrase. Application of the phrase classification model to a training example generates a predicted probability of the training phrase of the training example being an informational phrase based on the phrase embedding for a training phrase, the embedding for the training item, and the embedding for the training entity associated with the training item. The online system scores the phrase classification model based on a difference between a predicted probability of a training phrase of a training example being an informational phrase and the label applied to the training example. In various embodiments, applying a loss function to the label applied to a training example and the predicted probability of the training phrase of the training example being an informational phrase generates the score for the training example. Based on the score, the online system modifies one or more parameters comprising the phrase classification model through backpropagation, such as through gradient descent. In response to the score satisfying one or more criteria, the online system stops backpropagation and stores the phrase classification model.

After training, the online system applies the phrase classification model to multiple phrases generated from the images of the item, resulting in a set of probabilities of different phrases being an informational phrase. Each probability of the set corresponds to a different phrase generated from an image of the item. In some embodiments, the set of probabilities includes a probability for each phrase generated for the item from the images of the item being an informational phrase.

In response to receiving a request from a user for content describing the item, the online system selects a phrase generated for the item based on the probabilities. For example, the online system receives a request for an interface that includes content describing various items, with the interface including content describing the item. In various embodiments, the online system ranks phrases generated for the item based on the images of the item based on their corresponding probabilities of being an informational phrase and selects a phrase having at least a threshold position in the ranking (e.g., having a highest position in the ranking).

The online system modifies the content describing the item to include the selected phrase. For example, the online system overlays the selected phrase over a portion of the content describing the item, augmenting the content describing the item with a selected phrase extracted from an image of the item that the online system generated was an informational phrase based on the output of the phrase classification model. As an informational phrase increases a likelihood of the user performing the specific interaction with the item, including the selected phrase in the content describing the item increases a probability of the user interacting with the content describing the item to perform the specific interaction. For example, modifying content describing the item to include the selected phrase increases a likelihood of the user including the item in an order through interaction with the content describing the item. This leverages text included on the item's packaging to augment content describing the item with additional information about the item that makes the user more likely to perform the specific interaction with the item.

BRIEF DESCRIPTION OF THE DRAWINGS

FIG. 3 illustrates a flowchart of a method for augmenting content describing an item with one or more phrases extracted from one or more images of the item by an online system, in accordance with one or more embodiments.

DETAILED DESCRIPTION

Figure 1:
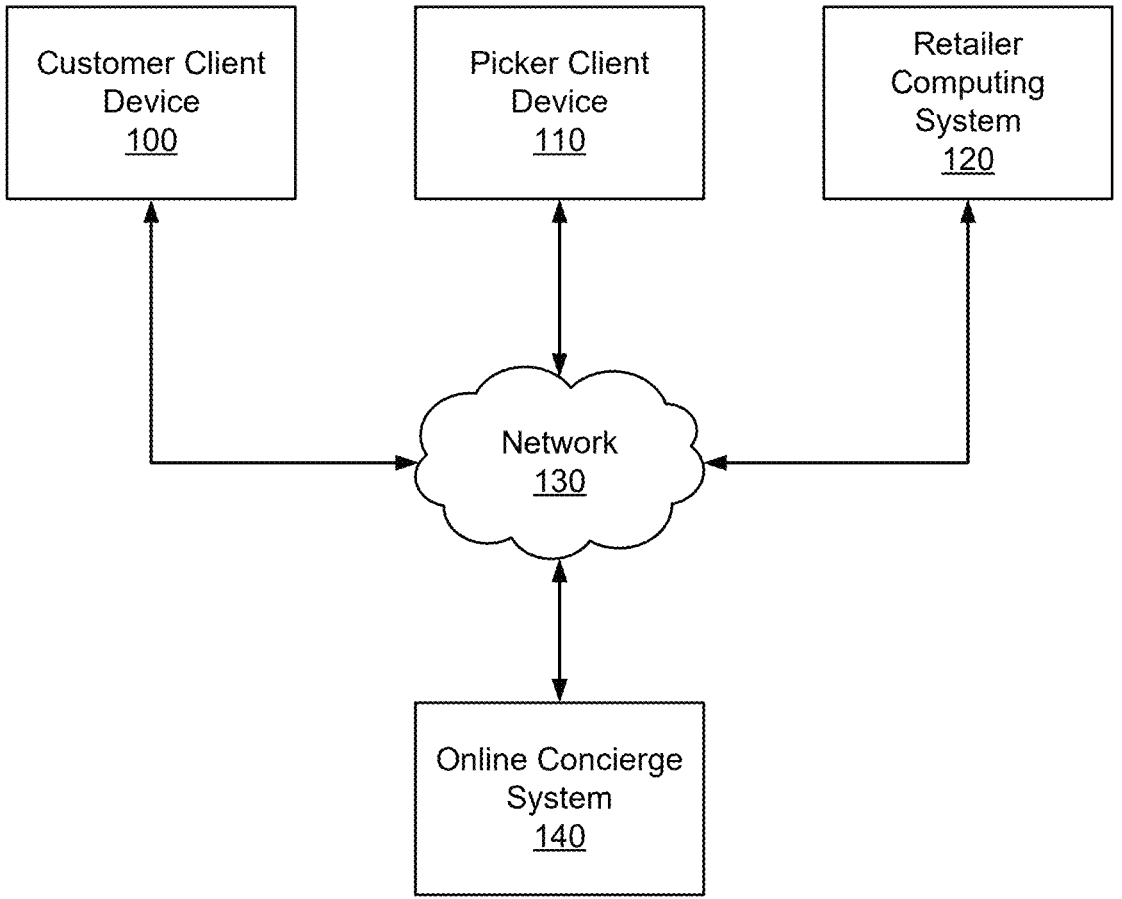
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the customer has selected for an order but that has not yet been finalized for an order. The ordering interface allows a customer to update the shopping list, e.g., by changing the quantity of items, adding or removing items, or adding instructions for items that specify how the item should be collected.

In various embodiments, the ordering interface presents content describing one or more items to a customer. For example, the ordering interface presents content describing different items offered by a retailer for inclusion in an order. As an example, content describing an item includes an image of the item and one or more attributes of the item. A customer may perform different interactions with content describing an item to obtain additional attributes of the item, to include the item in an order, or to otherwise interact with the item. For example, the ordering interface presents an interface element proximate to content describing an item, and a customer includes the item in an order by selecting the interface element.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the customer to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can generate an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and generates the item identifier for the item based on the images. The picker client device 110 may generate the item identifier directly or by transmitting the images to the online concierge system 140. Furthermore, the picker client device 110 generates a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
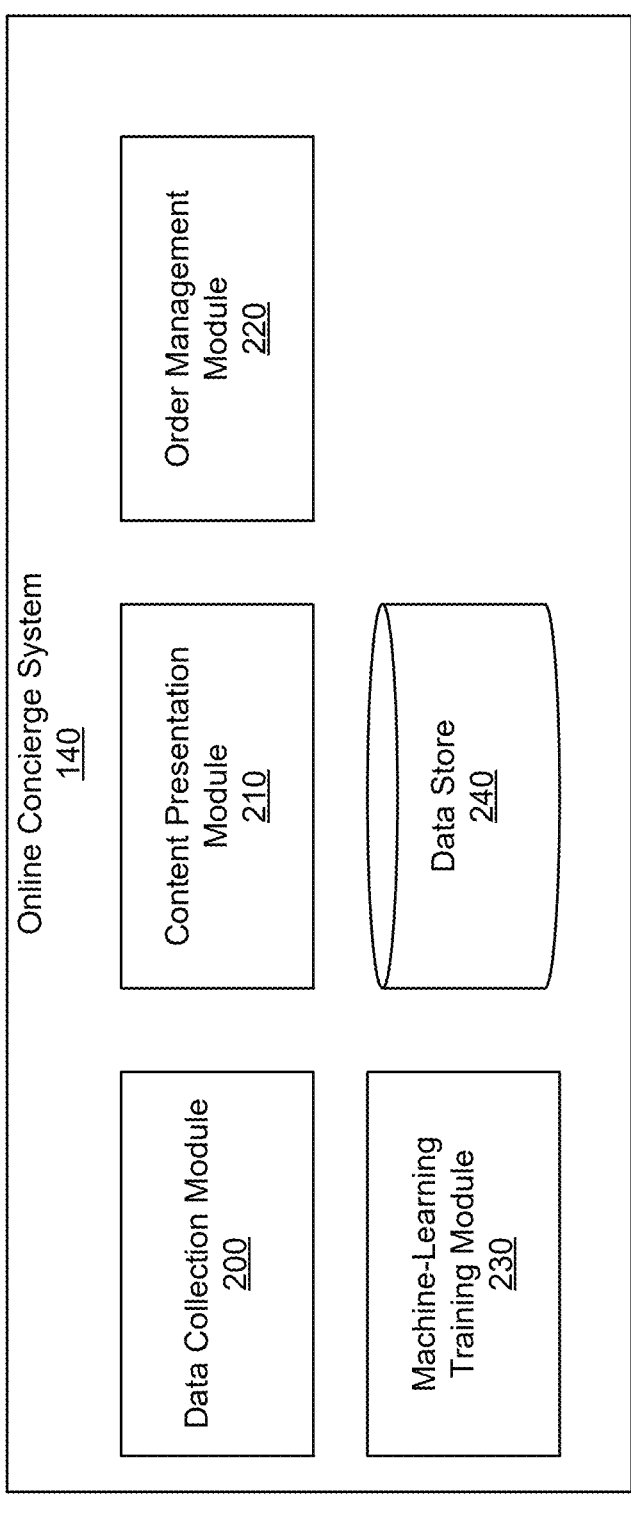
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

In various embodiments, the content presentation module 210 generates one or more interfaces that display (or otherwise present) content describing items to a customer. For example, an interface displays different content describing different items, providing a customer with descriptive information about multiple items. Content describing an item may include an image of the item and one or more attributes of the item. The content presentation module 210 leverages information about items maintained by the data store 240 to generate content describing an item. For example, the data store 240 includes an item catalog that identifies items offered by a retailer along with attributes of each item offered by the retailer. Alternatively or additionally, the content presentation module 210 obtains descriptive information of an item from a third party system (e.g., an entity associated with the item) or from a retailer computing system 120.

Many items offered by retailers, or otherwise available through the online system, are included in packaging that has text data describing the item. For example, an item is included in a box or in a bag having text on one or more sides identifying attributes of the item or describing one or more attributes of the item. Text on an item's package includes one or more informational messages, with an informational message comprising text data identifying, describing, or emphasizing an attribute of the item that increases a likelihood of a customer performing a specific interaction with the item. For example, an informational message describes a specific attribute of an item that increases a likelihood of a customer including the item in an order by at least a threshold amount. While content describing an item generated by the content presentation module 210 often includes an image of the item, customers are often unable to discern text data included on the item's packaging from the image. This prevents one or more informational messages included on the item's packaging from influencing a likelihood of the customer performing the specific interaction with the item.

In various embodiments, the content presentation module 210 extracts text from images of an item in its packaging and generates phrases for the item based on the extracted text to identify messages included on the item's packaging. As further described below in conjunction with FIGS. 3 and 4, the content presentation module 210 applies one or more models (e.g., optical character recognition models, multimodal large language models, etc.) to an image of the item in its packaging to extract text from the image. To account for variations in relative positioning of different portions of text on the item's packaging, the content presentation module 210 applies a generative model (e.g., a large language model) to text extracted from the image to generate one or more phrases for the item from the image. The generative model leverages learned relationships between different portions of text to combine different portions of text (e.g., different words) into phrases, so the content presentation module 210 accurately represents content included on the item's packaging.

As further described below in conjunction with FIGS. 3 and 4, the content presentation module 210 applies a trained phrase classification model to each phrase generated for the item. The phrase classification model generates a probability of a phrase being an informational phrase based on a phrase embedding for the phrase, an embedding of the item, and an embedding of an entity associated with the item. As further described above, an informational phrase is text data increasing a likelihood of a customer performing a specific interaction with the item. The content presentation module 210 generates a probability of various phrases generated for an item being an informational phrase and selects a phrase for the item based on the generated probabilities. For example, the content presentation module 210 ranks phrases based on their probabilities of being an informational phrase and selects a phrase having at least a threshold position in the ranking (e.g., having a highest position in the ranking).

The content presentation module 210 modifies content describing the item to include the selected phrase, as further described below in conjunction with FIGS. 3 and 4. Including a phrase from the item's packaging in the content describing the item leverages content presented by the item's packaging to increase a probability of the customer performing a specific interaction with the item via the content describing the item.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains or obtains one or more models for extracting text from an image. For example, the machine learning training module 230 obtains one or more optical character recognition models that extract text from an image. As another example, the machine learning training module 230 obtains a multimodal large language model (LLM) that receives input having a particular mode or type and generates output having an alternative mode or type. For example, a multimodal LLM receives an image as an input and generates text output based on the input image. The machine learning training module obtains or trains multiple models that extract text from an image in various embodiments.

Further, the machine learning training module 230 trains or obtains one or more generative models. A generative model, such as a large language model (LLM), receives an input including a prompt and generates output based on the received input. For example, a generative model may be a large language model (LLM) that was previously trained on a large text corpus to learn relationships between different portions of text, such as between different words. Based on the previously learned relationships, the LLM generates output text from text received as input based on a prompt received as input. For example, a LLM receives a set of words as input and a prompt to combine multiple words into phrases or sentences based on relationships between words that the LLM previously learned.

Additionally, the machine learning training module 230 trains a phrase classification model to generate a probability of a phrase for an item being an informational phrase. As further described above, an informational phrase includes text data that increases a probability of a customer (or other user) performing a specific interaction with an item. For example, an informational phrase increases the probability of a user performing the specific interaction with an item by a threshold amount. The phrase classification model receives a phrase embedding for a phrase, an embedding for an item, and an embedding for an entity associated with the item as an input, and generates the probability of the phrase being an informational phrase for the item.

The machine learning training module 230 trains the phrase classification model by obtaining multiple training examples. Each training example includes a phrase embedding for a training phrase, an embedding for a training item, and an embedding for a training entity associated with the training item. A label is applied to each training example, with a label applied to a training example indicating whether the training phrase in the training example is an informational phrase. The machine learning training module 230 applies the phrase classification model to a training example to generate a predicted probability of the training phrase of the training example being an informational phrase for the training item. The machine learning training module 230 scores the phrase classification model using a loss function based on a difference between a predicted probability of a training phrase of a training example being an informational phrase and the label applied to the training example. Based on the score, the machine learning training module 230 modifies one or more parameters comprising the phrase classification model through backpropagation, such as through gradient descent. In response to the score satisfying one or more criteria, the machine learning training module 230 stops backpropagation and stores the trained phrase classification model.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

FIG. 3 is a flowchart of a method for augmenting content describing an item with one or more phrases extracted from one or more images of the item by an online system, in accordance with some embodiments. Alternative embodiments may include more, fewer, or different steps from those illustrated in FIG. 3, and the steps may be performed in a different order from that illustrated in FIG. 3. These steps may be performed by an online system (e.g., online concierge system 140). Additionally, each of these steps may be performed automatically by the online system without human intervention.

An online system, such as an online concierge system 140, presents content describing various items available through the online system to users. For example, an online concierge system 140 displays content describing multiple items offered by a retailer selected by a user. A user performs a specific interaction with content describing an item via a client device (e.g., a customer client device 110) to select an item. For example, a client device of a user transmits a request to the online system to include an item in an order in response to the user performing the specific interaction with content describing the item. As another example, a client device of a user transmits a request to the online system to transmit the item to the client device in response to the user performing the specific interaction with content describing the item. Different online systems may perform different actions in response to a request received from a client device in response to the user performing the specific interaction with content describing an item presented by the client device.

In various embodiments, content describing an item an online system presents includes an image of the item and a subset of attributes of the item. For example, an online concierge system 140 generates an interface including content describing multiple items offered by a retailer, with the interface presenting content describing an item comprising an image of an item and a subset of attributes of the item. While this presents descriptive information about items to a user for evaluating whether to perform a specific interaction with an item (e.g., include an item in an order, request the item), presenting additional information about an item in the content describing the item may increase a likelihood of a user performing the specific interaction with the item. Additionally, a likelihood of a user performing a specific interaction with the item may be differently affected by presentation of different additional information for different items in conjunction with content describing different items. For example, presenting specific additional information with content describing a beverage may have greater influence on a user including the beverage in an order than presenting the specific additional information presented with content describing crackers.

Many items are included in packaging, such as a bag, a box, or another covering. The packaging including an item often includes text data describing the item or relevant to the item. For example, text data on an item's packaging identifies one or more attributes of the item, describes manufacture or creation of the item, identifies an origin of the item, or provides other information about the item. The text data on an item's packaging often includes informational messages. As further described above, an informational message comprises text data about an item (e.g., identifying an attribute of the item) that increases a likelihood of a user performing the specific interaction with the item. For example, an informational message comprises text data that increases a likelihood of a user performing the specific interaction with the item by at least a threshold amount. While the online system may include an image of the item in its packaging in content describing the item, the image size typically prevents a user from deciphering informational messages on the item's packaging, preventing the content of the item's packaging from increasing a likelihood of the user purchasing the item, obtaining the item, or performing another specific interaction with the item.

To leverage text data on an item's packaging (or included in another description of the item) when presenting content describing the item to users, the online system obtains 305 one or more images of an item. The online system may obtain 305 the images of the item from a retailer offering the item, from an entity associated with the item (e.g., a brand associated with the item, a manufacturer of the item, a distributor or the item, etc.), from a client device of a user (e.g., a customer client device 100, a picker client device 110). For example, a picker obtaining items from a retailer captures one or more images of the item using an image capture device of a picker client device 110, which transmits the images of the item to the online system. The images obtained 305 by the online system include the packaging of the item or other descriptive information associated with the item. In various embodiments, each obtained image includes the item in its packaging.

In various embodiments, different images of the item include different portions of the item's packaging (or of the item). For example, an item is included in packaging having multiple sides (e.g., a box), and different images correspond to different sides of the item's packaging. In some embodiments, the online system obtains 305 an image of each unique side of an item's packaging. For example, the online system obtains 305 six images of an item packaged in a box, with each image corresponding to a different side of the item's packaging. As another example, the online system obtains 305 two images of a bag in which an item is packaged, with one image including a front of the bag and the other image including the back of the bag. Obtaining multiple images of different portions of an item's packaging maximizes an amount of information about the packaging including an item (or other description of an item) accessible to the online system.

The online system extracts 310 text from each image of the item. In various embodiments, the online system extracts 310 text from an image of the item by applying one or more optical character recognition models to the image of the item. Alternatively, the online system applies a multimodal large language model (LLM) to an image of the item, with the multimodal LLM outputting text extracted from the image. A multimodal LLM receives input having a specific modality (or type) and generates output having an alternative modality (or type) that differs from the specific modality (or type). For example, a multimodal LLM receives an image as input and outputs text based on the received image, such as text extracted from the received image. The online system may apply multiple models to an image to extract 310 text from the image in various embodiments.

Text included on the item's packaging has variations in relative positioning of different portions of text based on dimensions of, a layout of, or structure of the packaging. For example, a layout of the item's packaging causes individual words forming a phrase to be presented on different lines or to be presented with variable spacing between different words. Such variation in positioning of different portions of text relative to each other creates variation between text extracted 310 from an image of the item and the content of the packaging of the item. For example, an item's packaging includes the phrase "no sugar added" with each word on a separate line, with the spacing between individual words causing the text extracted 310 from an image of the item to identify the individual words "no," "sugar," and "added," rather than the phrase "no sugar added." To mitigate discrepancies between text extracted 310 from an image and content on the item's packaging, the online system determines 315 phrases for an item based on an image of the item from the text extracted 310 from the image of the item. In various embodiments, the online system determines 315 phrases for each image of the item.

In various embodiments, the online system determines 315 phrases from text extracted 310 from an image of the item by applying a generative model, such as a large language model (LLM) to the text extracted 310 from the image. For example, the online system generates a prompt for a LLM including the text extracted 310 from the image of the item and an instruction to join portions of the extracted text to form complete phrases or sentences. As the LLM learned relationships between different portions of text received as an input through application to a large text corpus during pre-training, the LLM determines 315 phrases by applying the learned relationships to the input text extracted 310 from the image of the item.

One or more of the phrases determined 315 for the item includes multiple discrete portions of text extracted 310 from the image in various embodiments. For example, a phrase determined 315 for the item includes a plurality of individual words extracted 310 from the image of the item. In embodiments where the online system obtains 305 images of different portions of the item's packaging, the online system determines 315 phrases based on each image, determining a set of phrases for the item.

Different phrases determined 315 for the item based on the images of the item provide different amounts of information about the item, so the online system evaluates a likely effect of different phrases on a likelihood of a user performing a specific interaction with the item by generating 320 a phrase embedding for multiple phrases determined 315 for the item. In some embodiments, the online system generates 320 a phrase embedding for each phrase determined 315 for the item. A phrase embedding for a phrase represents the phrase in a high-dimensional latent space. In some embodiments, the online system applies a trained model to a phrase to generate 320 the phrase embedding for the phrase based on the portions of text comprising the phrase.

When the online system receives 325 a request from a user for content describing the item, the online concierge system 140 leverages the phrase embeddings for various phrases determined 315 for the item to generate 330 a probability of various phrases being an informational phrase for a user. As further described above, an "informational phrase" includes information about the item that increases a likelihood of the user performing a specific interaction with the item. For example, an informational phrase includes information about the item that increases a likelihood of the user including the item in an order. As another example, an informational phrase includes information about the item that increases a likelihood of the user requesting additional information about the item from the online system. In some embodiments, an informational phrase includes information about the item that increases a likelihood of the user performing the specific interaction with the item by at least a threshold amount. For example, the online system receives 325 a request from the user for an interface that includes content describing the item.

In some embodiments, the online system generates 330 probabilities of various phrases determined for the item being informational phrases after generating 320 phrase embeddings for the phrases and before receiving 325 the request for content describing the item. The online system stores the probability of a phrase determined for the item being an informational phrase in association with the phrase determined for the item. Alternatively, the online system generates 330 probabilities of phrases determined for the item being informational phrases after receiving 325 the request from the user.

In various embodiments, the online system applies a phrase classification model to a combination of a phrase embedding of a phrase, an embedding for the item, and an embedding for an entity associated with the item (e.g., a brand associated with the item, a manufacturer associated with the item) to generate 330 a probability of the phrase being an informational phrase. The online concierge system 140 trains the phrase classification model by generating a training dataset including multiple training examples. Each training example includes a phrase embedding for a training phrase, an embedding for a training item, and an embedding for a training entity associated with the training item. A label is applied to each training example, with a label applied to a training example indicating whether the training phrase in the training example is an informational phrase. For example, the label has a particular value when the training phrase is an informational phrase and has an alternative value when the training phrase is not an informational phrase.

In various embodiments, the online system generates the training dataset by presenting different training phrases to a user, such as a customer, and receiving a label from the user for each training phrase. The label received from the user for a training phrase indicates whether the user classified the training phrase as an informational phrase or did not classify the training phrase as an informational phrase. Alternatively, the online receives a training dataset from an entity associated with one or more items (e.g., a manufacturer of one or more items, a brand associated with one or more items, etc.), with the entity associated with one or more items providing labels for different training phrases to indicate whether a training phrase is an informational phrase or is not an informational phrase. In other embodiments, the online system applies a trained large language model (LLM) to a training phrase included in a prompt that requests the LLM to indicate whether the training phrase is an informational phrase. The output of the LLM for the training phrase comprises the label applied to a training example based on the training phrase, allowing the online system to leverage the LLM to generate the training dataset for the phrase classification model.

To train the phrase classification model, the online concierge system 140 initializes the set of weights comprising the phrase model and applies the model to multiple training examples of the training dataset. Applying the phrase classification model to multiple training examples generates parameters (e.g., weights) of the phrase classification model. The parameters comprising the phrase classification model transform the input data—a phrase embedding of a phrase associated with an item, an embedding of the item, and an embedding of an entity associated with the item—into a probability of the phrase being an informational phrase. When applied to a training example, the phrase classification model generates a predicted probability of the training phrase of the training example being an informational phrase.

For each training example to which the phrase classification model is applied, the online system generates a score comprising an error term based on a predicted probability of a training phrase in a training example being an informational phrase generated by the phrase classification model and the label applied to the training example. The error term is larger when a difference between the predicted probability of the training phrase being an informational phrase and the label applied to the training example is larger and is smaller when the difference between the predicted probability of the training phrase being an informational phrase and the label applied to the training example is smaller. In various embodiments, the online system generates the error term using a loss function based on a difference between the predicted probability of the training phrase being an informational phrase and the label applied to the training example using a loss function. Example loss functions include a mean square error function, a mean absolute error, a hinge loss function, and a cross-entropy loss function.

The online system backpropagates the error term to update the set of parameters comprising the phrase classification model and stops backpropagation in response to the error term, or to the loss function, satisfying one or more criteria. For example, the online system backpropagates the error term through the phrase classification model to update parameters of the phrase classification model until the error term has less than a threshold value. For example, the online system 140 may apply gradient descent to update the set of parameters. The online concierge system 140 stores the set of parameters comprising the phrase classification model on a non-transitory computer readable storage medium after stopping the backpropagation.

In other embodiments, the phrase classification model is a large language model. For example, the online system generates a prompt for the large language model including a phrase and including a prompt requesting the large language model to indicate whether the phrase is an informational phrase. The large language model leverages previously learned relationships between portions of text to generate a text output indicating whether the phrase received as input is an informational phrase. In some embodiments, the large language model outputs a probability of the phrase being an informational phrase for the item in response to the input including the prompt and the phrase.

Based on the probabilities of phrases determined 315 for the item being informational phrases, the online system selects 335 a phrase determined for the item. In some embodiments, the online system ranks phrases determined 315 for the item based on their corresponding probabilities of being an informational phrase and selects 335 one or more phrases having at least a threshold position in the ranking. For example, the online system selects 335 a phrase determined 315 for the item having a highest position in the ranking. As another example, the online system selects 335 a phrase having at least a threshold probability of being an informational phrase. In some embodiments, the online system selects 335 a single phrase determined 315 for the item based on their corresponding probabilities, while in other embodiments, the online system selects multiple phrases determined 315 for the item based on their corresponding probabilities.

The online system modifies 340 content describing the item for presentation to the user in response to the request by augmenting the content describing the item with the selected phrase. For example, the online system includes the selected phrase in a specific location within the content describing the item. As an example, the online system overlays the selected phrase over a portion of an image of the item. In another example, the online system includes the selected phrase determined for the item in a specific location of content describing the item (e.g., in an upper left corner of content describing the item, in an upper right corner of content describing the item). In some embodiments, the content describing the item is content generated by the online system. Alternatively, the content describing the item is content that the online system receives from a third party system that provides the online system with compensation in response to a user performing a specific interaction with the item or with the content describing the item.

In some embodiments, the online system generates a probability of the user performing the specific interaction with the item when the content describing the item is not modified and generates a modified probability of the user performing the specific interaction with the item when the modified content describing the item is presented. For example, the online system trains and maintains an interaction model that generates a probability of a user performing a specific interaction with an item based on an embedding of the item, an embedding of the user, and a phrase embedding of a phrase selected for the item, Through a training process where the interaction model is applied to interaction training examples each including a training item, a training user, and a training phrase embedding, as further described above in conjunction with FIG. 2, the online system trains the interaction model to generate the probability of a user performing the specific interaction with content describing the item that includes the phrase. The online system applies the interaction model to the embedding of the item and the embedding of the user, with no phrase embedding, to generate the probability of the user performing the specific interaction with the item and applies the interaction model to the embedding of the item, the embedding of the user, and the phrase embedding of the selected phrase to generate the modified probability. In response to the modified probability being greater than the probability, the online system transmits 345 the modified content describing the item to the client device. However, in response to the modified probability not exceeding the probability, the online system transmits the content describing the item, without modification to include the selected phrase, in some embodiments. So the online system may account for an effect of the selected phrase on the user performing the specific action when modifying 340 the content describing the item.

The online system transmits 345 the modified content describing the item that includes the selected phrase to a client device for presentation to a user. For example, the online system transmits 345 an interface including the modified content describing the item that includes the selected phrase to a customer client device 100. Subsequently, the customer client device 110 displays the modified content describing the item, allowing the user to view the selected phrase via the modified content describing the item. The interface may present content describing different items, allowing a user to review and to select an item by interacting with corresponding content describing the item. Alternatively, the interface presents the modified content describing the item without displaying content describing other items.

Presenting the selected phrase for the item in conjunction with the content describing the item increases a likelihood of the user selecting the item via an interface that displays the modified content describing the item to the user. Because the online system selects 340 the phrase for the item based on probabilities of phrases determined 315 from images of the item being an informational phrase, presentation of the selected phrase along with other descriptive information about the item makes the user more likely to perform a specific interaction with the item, which increases a likelihood of the user interacting with the modified content describing the item.

In various embodiments, the online system trains and maintains the interaction model that generates a probability of a user performing a specific interaction with content describing the item based on an embedding of the item and an embedding of the user, as further described above. The online system determines an order in which content describing items is presented to a user based on probabilities of the user performing the specific interaction with content describing different items in some embodiments. Alternatively, the online system selects content describing one or more items for presentation based on corresponding probabilities of the user performing the specific interaction with content describing various items. The online system modifies the interaction model in some embodiments to receive a phrase embedding for a phrase determined for the item along with the embedding of the customer and the embedding of the item. Through a training process where the interaction model is applied to interaction training examples each including a training item, a training user, and a training phrase embedding, as further described above in conjunction with FIG. 2, the online system trains the interaction model to generate the probability of a user performing the specific interaction with content describing the item that includes the phrase. For example, the online system selects 335 a phrase for the item, as further described above, then generates a probability of the user performing the specific interaction with the modified content describing the item that include the selected phrase by applying the interaction model to the embedding of the user, the embedding of the item, and the phrase embedding for the selected phrase. Including the phrase embedding as an input to the interaction model accounts for the influence of the phrase embedding on the user performing the specific interaction with the item when included in information describing the item.

Figure 4:
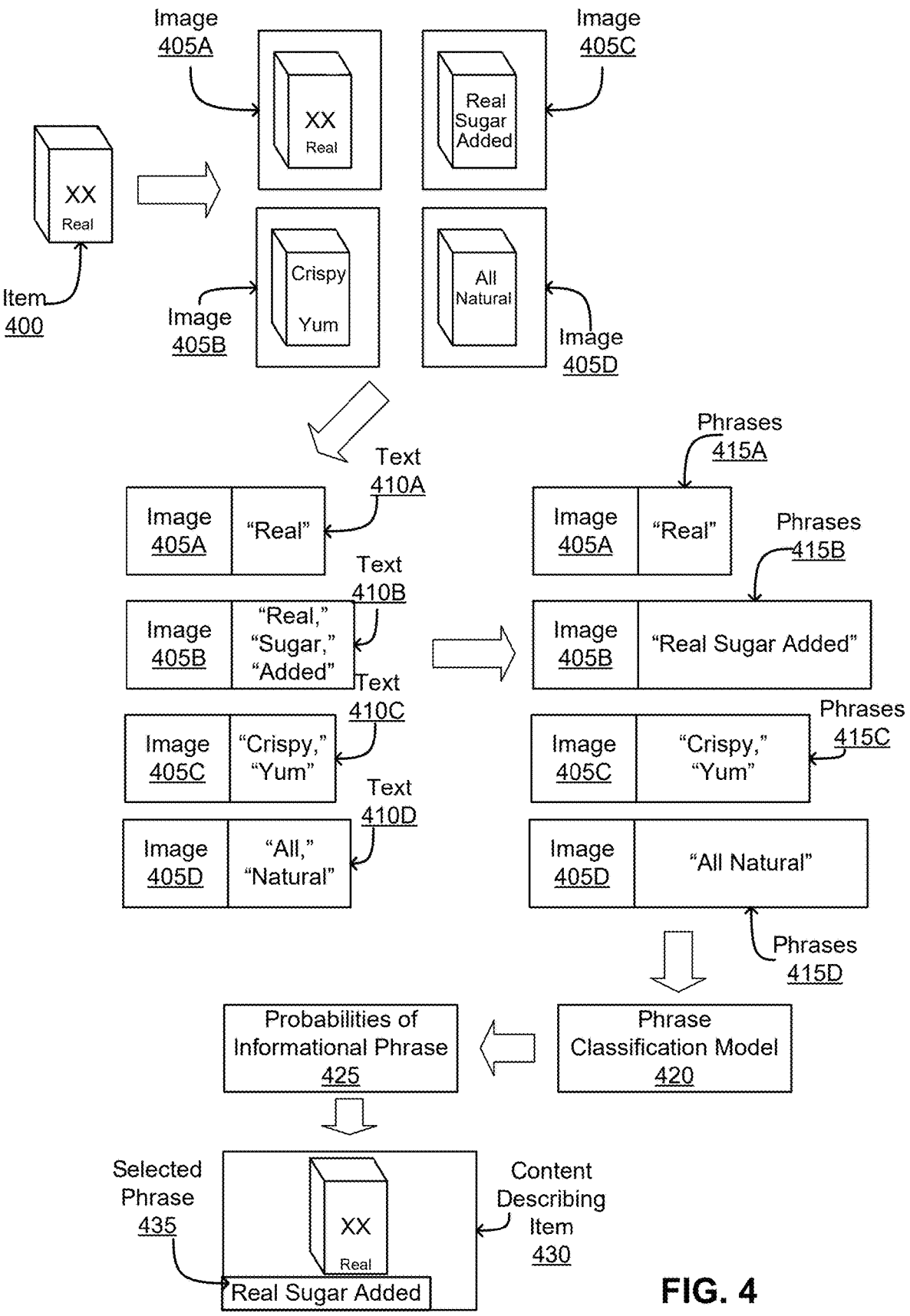
FIG. 4 illustrates a process flow diagram of a method for augmenting content describing an item with one or more phrases extracted from one or more images of the item by an online system, in accordance with one or more embodiments.

FIG. 4 is a process flow diagram of a method for augmenting content describing an item with one or more phrases extracted from one or more images of the item by an online system. An online system, such as an online concierge system 140, maintains or obtains information describing various items available to users of the online system. For example, the online concierge system 140 maintains an item catalog for a retailer including information describing items a user (e.g., a customer) may obtain from the retailer. In various embodiments, the item catalog includes attributes of each item, one or more images of each item, or other descriptive information about each item. The online system displays content describing one or more items available to a user through one or more interfaces. The user may select an item for inclusion in an order or otherwise select an item by performing a specific interaction with content describing the item. For example, the online system receives a search query from a user, selects items having at least one attribute that at least partially matches the search query, and generates an interface including content describing each selected item to the user.

Content describing an item 400 and presented by the online system includes various attributes or other descriptive information about the item in various embodiments. For example, content describing the item 400 comprises an image of the item 400 from an item catalog (or obtained from an entity associated with the item) and one or more attributes of the item 400 from the item catalog (e.g., a cost of the item, a size of the item, one or more constituent components of the item, etc.) or obtained from another source. While content describing items presented by the online system allows a user to review different items, the descriptive information included in content describing the item 400 is based on information about the item 400 maintained by the online system, by a retailer, or by an entity associated with the item 400.

Many items are included in packaging, with the packaging displaying information about the item 400, such as text data describing the item 400 or text data otherwise relevant to the item 400. Portions of the text data on packaging of the item 400 may include one or more informational messages, with an informational message comprising text that increases a likelihood of a user performing a specific interaction with the item 400 (e.g., purchasing the item 400 or obtaining the item 400). For example, an informational message describes one or more specific attributes of the item 400. As another example, an informational message emphasises one or more steps in creation of the item 400. While content describing the item 400 presented by the online system often includes an image of the item 400 in its packaging, informational messages on the packaging may be difficult to be deciphered by the user from the image of the item. This prevents the text data on the item's packaging from affecting a probability of the user performing the specific interaction with the item 400. Augmenting content describing the item 400 with additional information about the item, such as one or more informational phrases on the item's packaging, may increase a likelihood of the user performing one or more specific interactions with the item 400. For example, an attribute of the item emphasized by an informational message on the item's packaging complements content describing the item 400 included in content describing the item 400 and increases a likelihood of a user including the item 400 in an order.

To leverage text data on the item's packaging when presenting content describing the item 400, the online system obtains one or more images 405A-D (also referred to individually and collectively using reference number 405) or the item 400. In various embodiments, each image 405 corresponds to a different portion of packaging of the item 400. For example, each image 405 corresponds to a different surface of packaging of the item 400. In the example of FIG. 4, image 405A is of a front surface of the item's packaging, image 405B is of a back surface of the item's packaging, image 405C is of a left surface of the item's packaging, and image 405D is of a right surface of the item's packaging. In some embodiments, multiple images 405 of a surface, or of another portion, of the item's packaging may be obtained by the online system. Images 405 of the item 400 may be obtained from client devices (e.g., a customer client device 100, a picker client device 110), from a retailer system 120, from a third party system, or from an entity associated with the item 400 (e.g., a manufacturer of the item 400, a distributor of the item 400, a brand associated with the item 400, etc.). Further, images 405 of the item 400 may be obtained from multiple sources in various embodiments.

The online system extracts text 410A-D (also referred to individually and collectively using reference number 410) from each image 405A-D. As further described above in conjunction with FIG. 3, the online system applies one or more optical character recognition models, computer vision models, or multimodal large language models, to an image 405 to extract text 410 from the image 405. In the example of FIG. 4, the online system extracts text 410A of "real" from image 405A and extracts text 410B of "real," "sugar," and "added" from image 405B. Similarly, the online system extracts text 410C of "crispy" and "yum" from image 405C, and extracts text 410D of "all" and "natural" from image 405D. One or more models applied to an image 405 extract individual words 410 from the image 405. In different embodiments, the online system applies different models or combinations of models to an image 405 to extract text 410 from an image 405. Text extracted from an image 405 of the item 400 is stored in association with the image 405 from which it is extracted.

While application of one or more models to images 405 of the item 400 extracts text 410 from various images 405, text 410 extracted from an image 405 by the online system is affected by positioning of text or characters on the packaging included in the image 405. For example, words appearing on different lines in an image 405 are extracted as discrete words, rather than as a phrase. As the dimensions or the shape of the item's packaging affects formatting and relative positioning of text on the packaging, text 410 extracted from an image 405 of the item 400, or of the item's packaging, may not accurately represent the content conveyed to users by the item's packaging. For example, a phrase is displayed across multiple lines on the item's packaging, with the positioning of the text comprising the phrase causing the online system to extract individual words comprising the phrase rather than the phrase in its entirety. In the example of FIG. 4, text 410B extracted from image 410B identifies the discrete words "real," "sugar," and "added," with identifying the individual words providing different information than the combination of the words presented by the packaging of the item 400.

To mitigate for effects of relative positioning of different words on an item's packaging on text 410 extracted from an image 405, the online system applies one or more models to text 410 extracted from an image 405 of the item's packaging to determine phrases 415A-D (also referred to individually and collectively using reference number 415) for the item 400 from various images 405A-D of the item 400. In various embodiments, the online system applies a generative model, such as a large language model (LLM) to the text 410 extracted from an image 405 of the item 400 to determine one or more phrases 415 for the item from the image 405. For example, the online system generates a prompt for a LLM including the text 410 extracted from the image 405 and an instruction to join portions of the extracted text 410 to form complete phrases or sentences. As further described above, the LLM is pre-trained on a large text corpus to determine relationships between different portions of text and generates phrases 415 each comprising one or more portions of the extracted text 410 based on the instruction in the prompt. In some embodiments, at least one of the phrases 415 comprises a combination of a plurality of portions of the extracted text 410. The online system determines one or more phrases 415 from text 410 extracted from obtained image 405 of the item 400 in various embodiments, creating a set of phrases 415 for the item 400 based on the images 405. In embodiments where the online system obtains images 405 of different portions of the item's packaging, the set of phrases 415 includes phrases determined for each image 405 of the item 400.

As further described above in conjunction with FIG. 3, the online system applies a generative model, such as a large language model (LLM), to text 410 extracted from an image 405 to determine one or more phrases 415 for the item 400 from the image 405. For example, the generative model is a large language model pre-trained through application to a large text corpus to learn relationships between different portions of text (e.g., different words, different phrases). The online system generates a prompt for the LLM including text 410 extracted from an image 405 and an instruction for the LLM to join portions of the extracted text 410 to form complete phrases or sentences. The LLM leverages the previously learned relationships between portions of text to generate phrases 415 that each comprise one or more portions of the extracted text 410 based on the instruction in the prompt. One or more of the phrases 415 for an image 405 include multiple words 410 in the example of FIG. 4, so the LLM compensates for variations in positioning of text relative to each other on a portion of the item's packaging in an image 405 affecting extraction of text 410 from the image 405.

The online system determines phrases 415 for each obtained image 405 of the item 400 in various embodiments, creating a set of phrases 415 for the item based on the images 405 of the item 400. In the example of FIG. 4, the online system generates phrases 415A for image 405A based on text 410A and generates phrases 415B for image 405B based on text 410B. Similarly, the online system generates phrases 415C for image 405C based on text 410B and generates phrases 415D for image 405D based on text 410B. As shown in the example of FIG. 4, a model applied to text 410B combines the individual words "real," "sugar," and "added" into the phrase "real sugar added," providing a cohesive phrase from the individual words extracted from the image 405B of the item's packaging. Similarly, applying the model to text 410D generates the phrase "all natural" from the individual words "all" and "natural" extracted from images 405D. Generating phrases 415 from the extracted text 410B allows the online system to compensate for effects of relative positioning of different portions of text on the packaging of the item 400 on the text extraction.

Different phrases 415 generated from the images 405 provide varying levels of information about the item 400 to a user. While informational phrases emphasize or identify specific attributes of the item 400, other phrases provide contextual information about the item 400 or about an entity associated with the item 400 that is unlikely to affect a user's likelihood of performing the specific interaction with the item 400. Hence, different phrases 415 differently affect a likelihood of a user performing a specific interaction with the item 400. To evaluate different phrases 415 on the user performing the specific interaction with the item 400, the online system generates a phrase embedding for each phrase 415 that represents a phrase in a latent space. The online system applies a trained phrase classification model 420 to each combination of a phrase embedding, an embedding of the item 400, and an embedding of an entity associated with the item 400 (e.g., a brand associated with the item 400, a distributor of the item 400, a manufacturer of the item 400, etc.). as further described above in conjunction with FIG. 3, to generate a probability of a phrase corresponding to the phrase embedding being an informational phrase. As further described above, an informational phrase is a phrase including information about the item 400 that increases a likelihood of the user performing a specific interaction with the item 400. The online system applies the phrase classification model 420 to multiple phrases 415, generating a set of probabilities 425 of different phrases being an informational phrase. Each probability 425 of the set corresponds to a different phrase 415 generated from an image 405 of the item 400. In some embodiments, the set of probabilities 425 includes a probability 425 for each phrase 415 generated for the item 400 from the images 405 of the item 400 being an informational phrase.

In response to receiving a request from a user for content describing the item 400, the online system selects a phrase 415 generated for the item based on the probabilities 425. For example, the online system receives a request for an interface that includes content describing various items, with the interface including content 430 describing the item 400. In various embodiments, the online system ranks phrases 415 generated for the item based on the images 405 of the item 400 based on their corresponding probabilities 425 of being an informational phrase and selects a phrase having at least a threshold position in the ranking (e.g., having a highest position in the ranking).

The online system modifies the content 430 describing the item 400 to include the selected phrase 435. For example, the online system overlays the selected phrase 435 over a portion of the content 430 describing the item 400 to augment the content 430 describing the item 400 with the selected phrase 435 generated based on text 410 extracted from an image 405 of the item 400. As an informational phrase increases a likelihood of the user performing the specific interaction with the item 400, selecting the phrase 415 included in the modified content 430 describing the item 400 based on probabilities of phrases 415 being informational phrases increases a probability of the user interacting with the content 430 describing the item 400. This leverages text included on the item's packaging to augment the content 430 describing the item 400 with additional information about the item 400 that makes the user more likely to perform the specific interaction with the item 400.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

obtaining, at the computer system, one or more images of an item;

extracting, by the computer system, text from each image of the item;

generating one or more phrases for each image of the item, wherein the one or more phrases are generated by applying a trained large language model to the extracted text;

generating a phrase embedding for each phrase;

generating a probability of each phrase being an informational phrase that increases a likelihood of a user performing a specific interaction with the item by applying a phrase classification model to a phrase embedding of a phrase, an embedding for the item, and an embedding for an entity associated with the item, the phrase classification model trained by:

obtaining a training dataset including a plurality of training examples, each training example including a training phrase embedding for a training phrase, an embedding for a training item, and an embedding for an entity associated with the training item, each training example having a label indicating whether the training phrase is the informational phrase;

applying the phrase classification model to each training example of the training dataset to generate a predicted probability of the training phrase in a training example being the informational phrase;

scoring the phrase classification model using a loss function and the label of the training example; and updating one or more parameters of the phrase classification model by backpropagation based on the scoring until one or more criteria are satisfied;

selecting a phrase for the item based on the generated probabilities;

modifying content describing the item to include the selected phrase;

receiving a request for content describing the item at the computer system from a client device; and transmitting an interface including the modified content describing the item to the client device, wherein transmitting the interface causes the client device to display the interface.

2. The method of claim 1, wherein modifying content describing the item to include the selected phrase comprises:

overlaying the selected phrase in a specific portion of the content describing the item.

3. The method of claim 1, wherein modifying content describing the item to include the selected phrase comprises:

generating a probability of the user performing the specific interaction with the item for the content describing the item without the selected phrase based on the embedding of the item and the embedding of the user;

generating a modified probability of the user performing the specific interaction with the item for the modified content describing the item including the selected phrase based on the embedding of the item, the embedding of the user, and the phrase embedding for the selected phrase; and modifying the content describing the item to include the selected phrase in response to the modified probability exceeding the probability.

4. The method of claim 1, wherein extracting text from each image of the item by the computer system comprises:

applying one or more optical character recognition models to an image of the item by the computer system to extract text from the image.

5. The method of claim 1, wherein extracting text from each image of the item by the computer system comprises:

applying a multimodal large language model to an image of the item, the multimodal large language model generating text from the image.

6. The method of claim 1, wherein the specific interaction with the item comprises including the item in an order fulfilled by the computer system.

7. The method of claim 1, wherein obtaining one or more images of an item at the computer system comprises:

obtaining an image of each portion of packaging of the item at the computer system.

8. The method of claim 1, wherein each of the one or more images includes a portion of packaging of the item.

9. The method of claim 8, wherein different images include different portions of packaging of the item.

10. The method of claim 1, wherein selecting the phrase for the item based on the generated probabilities comprises:

ranking the one or more phrases based on the generated probabilities; and selecting a phrase having at least a threshold position in the ranking.

11. A computer program product comprising a non-transitory computer readable storage medium having instructions encoded thereon that, when executed by a processor, cause the processor to perform steps comprising:

obtaining one or more images of an item;

extracting text from each image of the item;

generating one or more phrases for each image of the item, wherein the one or more phrases are generated by applying a trained large language model to the extracted text;

generating a phrase embedding for each phrase;

generating a probability of each phrase being an informational phrase that increases a likelihood of a user performing a specific interaction with the item by applying a phrase classification model to a phrase embedding of a phrase, an embedding for the item, and an embedding for an entity associated with the item, the phrase classification model trained by:

obtaining a training dataset including a plurality of training examples, each training example including a training phrase embedding for a training phrase, an embedding for a training item, and an embedding for an entity associated with the training item, each training example having a label indicating whether the training phrase is the informational phrase;

applying the phrase classification model to each training example of the training dataset to generate a predicted probability of the training phrase in a training example being the informational phrase;

scoring the phrase classification model using a loss function and the label of the training example; and updating one or more parameters of the phrase classification model by backpropagation based on the scoring until one or more criteria are satisfied;

selecting a phrase for the item based on the generated probabilities;

modifying content describing the item to include the selected phrase;

receiving a request for content describing the item from a client device; and transmitting an interface including the modified content describing the item to the client device, wherein transmitting the interface causes the client device to display the interface.

12. The computer program product of claim 11, wherein modifying content describing the item to include the selected phrase comprises:

overlaying the selected phrase in a specific portion of the content describing the item.

13. The computer program product of claim 11, wherein modifying content describing the item to include the selected phrase comprises:

generating a probability of the user performing the specific interaction with the item for the content describing the item without the selected phrase based on the embedding of the item and the embedding of the user;

generating a modified probability of the user performing the specific interaction with the item for the modified content describing the item including the selected phrase based on the embedding of the item, the embedding of the user, and the phrase embedding for the selected phrase; and modifying the content describing the item to include the selected phrase in response to the modified probability exceeding the probability.

14. The computer program product of claim 11, wherein extracting text from each image of the item comprises:

applying one or more optical character recognition models to an image of the item to extract text from the image.

15. The computer program product of claim 11, wherein extracting text from each image of the item comprises:

applying one or more multimodal large language models to an image of the item to extract text from the image.

16. The computer program product of claim 11, wherein obtaining one or more images of an item comprises:

obtaining an image of each portion of packaging of the item.

17. The computer program product of claim 11, wherein each of the one or more images includes a portion of packaging of the item.

18. The computer program product of claim 17, wherein different images include different portions of packaging of the item.

19. The computer program product of claim 11, wherein selecting the phrase for the item based on the generated probabilities comprises:

ranking the one or more phrases based on the generated probabilities; and selecting a phrase having at least a threshold position in the ranking.

20. A system comprising:

a processor; and a non-transitory computer readable storage medium having instructions encoded thereon that, when executed by the processor, cause the processor to perform steps comprising:

obtaining one or more images of an item;

extracting text from each image of the item;

generating one or more phrases for each image of the item, wherein the one or more phrases are generated by applying a trained large language model to the extracted text;

generating a phrase embedding for each phrase;

generating a probability of each phrase being an informational phrase that increases a likelihood of a user performing a specific interaction with the item by applying a phrase classification model to a phrase embedding of a phrase, an embedding for the item, and an embedding for an entity associated with the item, the phrase classification model trained by:

obtaining a training dataset including a plurality of training examples, each training example including a training phrase embedding for a training phrase, an embedding for a training item, and an embedding for an entity associated with the training item, each training example having a label indicating whether the training phrase is the informational phrase;

applying the phrase classification model to each training example of the training dataset to generate a predicted probability of the training phrase in a training example being the informational phrase;

scoring the phrase classification model using a loss function and the label of the training example; and updating one or more parameters of the phrase classification model by backpropagation based on the scoring until one or more criteria are satisfied;

selecting a phrase for the item based on the generated probabilities;

modifying content describing the item to include the selected phrase;

receiving a request for content describing the item from a client device; and transmitting an interface including the modified content describing the item to the client device, wherein transmitting the interface causes the client device to display the interface.

\* \* \* \* \*